G. R. CORNWALL.
DEVICE FOR MAKING PRINTING PLATES.
APPLICATION FILED NOV. 30, 1914.
1,243,264.
Patented Oct. 16, 1917.
7 SHEETS—SHEET 2.
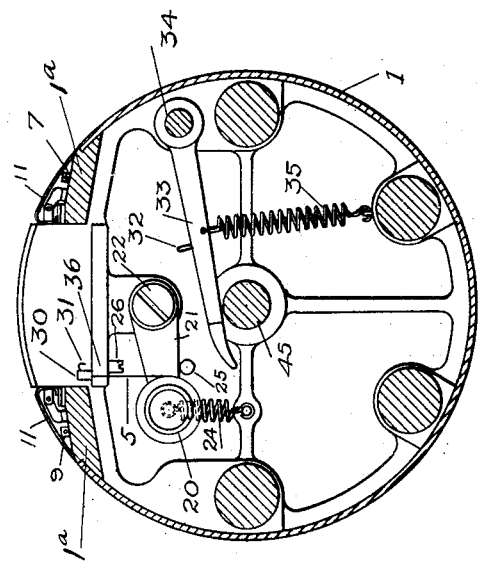
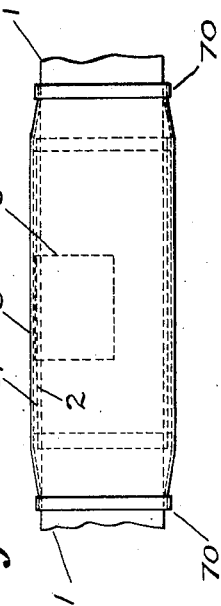
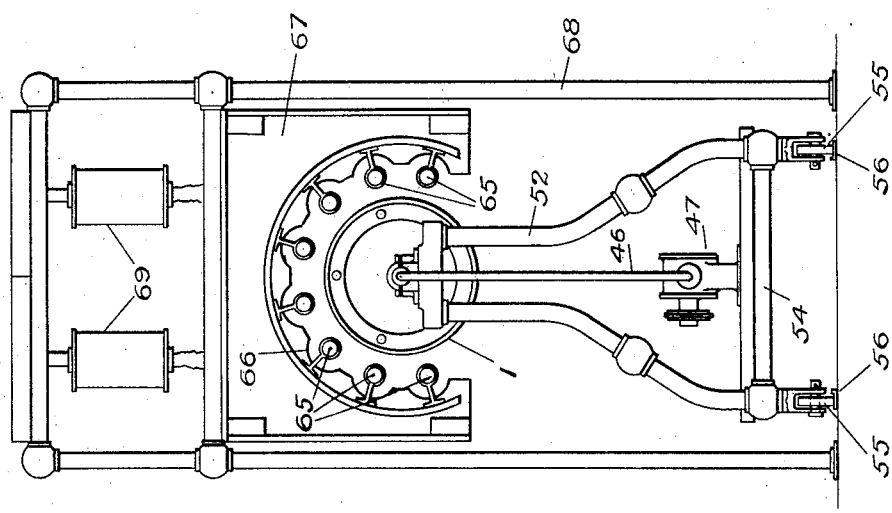

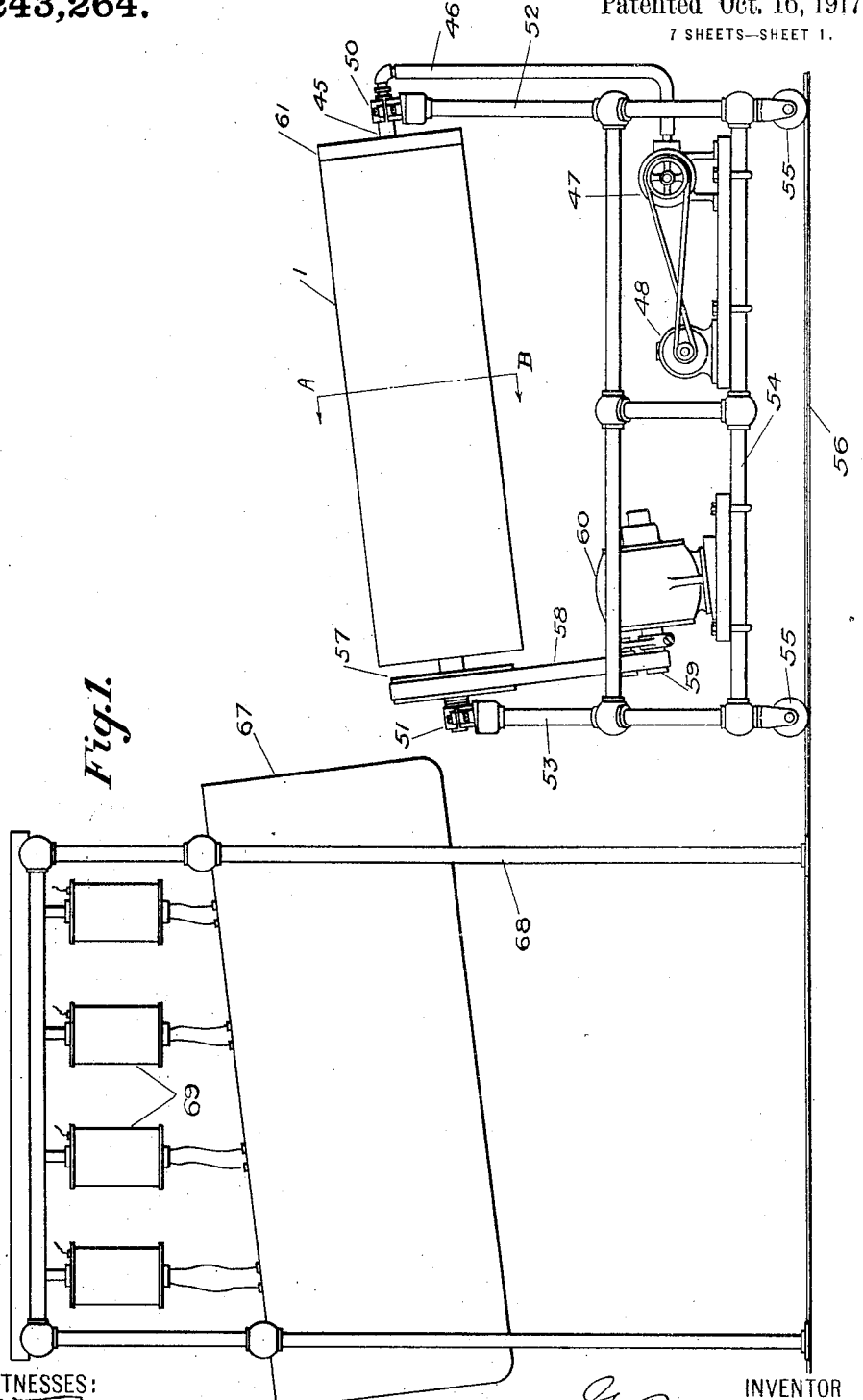

G. R. CORNWALL.
DEVICE FOR MAKING PRINTING PLATES.
APPLICATION FILED NOV. 30, 1914.

1,243,264.

Patented Oct. 16, 1917.
7 SHEETS—SHEET 3.

WITNESSES:
F. G. Rayno
Louisa Loehr

INVENTOR
G. R. Cornwall
BY
John D. Morgan
ATTORNEY

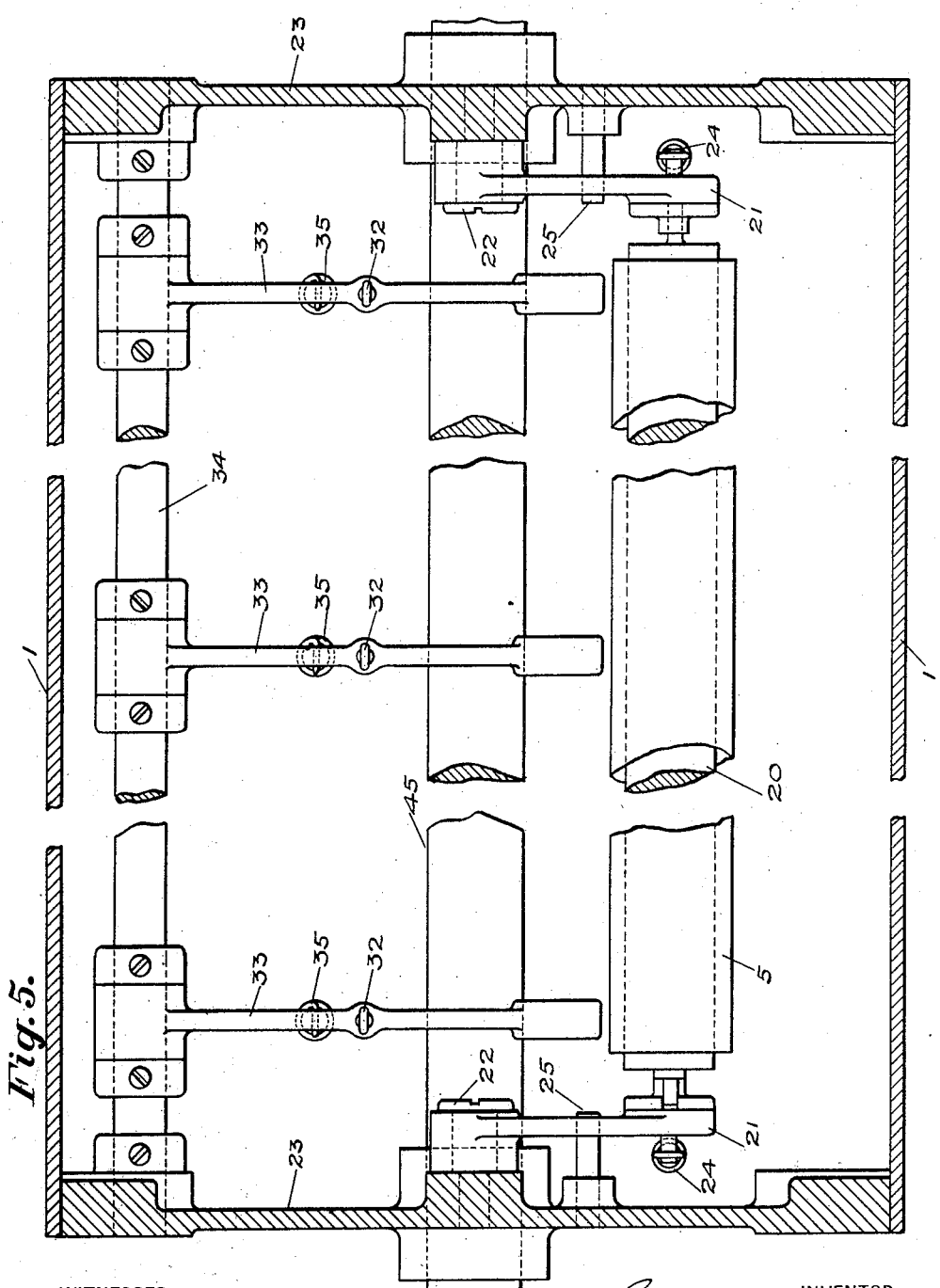

G. R. CORNWALL.
DEVICE FOR MAKING PRINTING PLATES.
APPLICATION FILED NOV. 30, 1914.
1,243,264.
Patented Oct. 16, 1917.
7 SHEETS—SHEET 5.
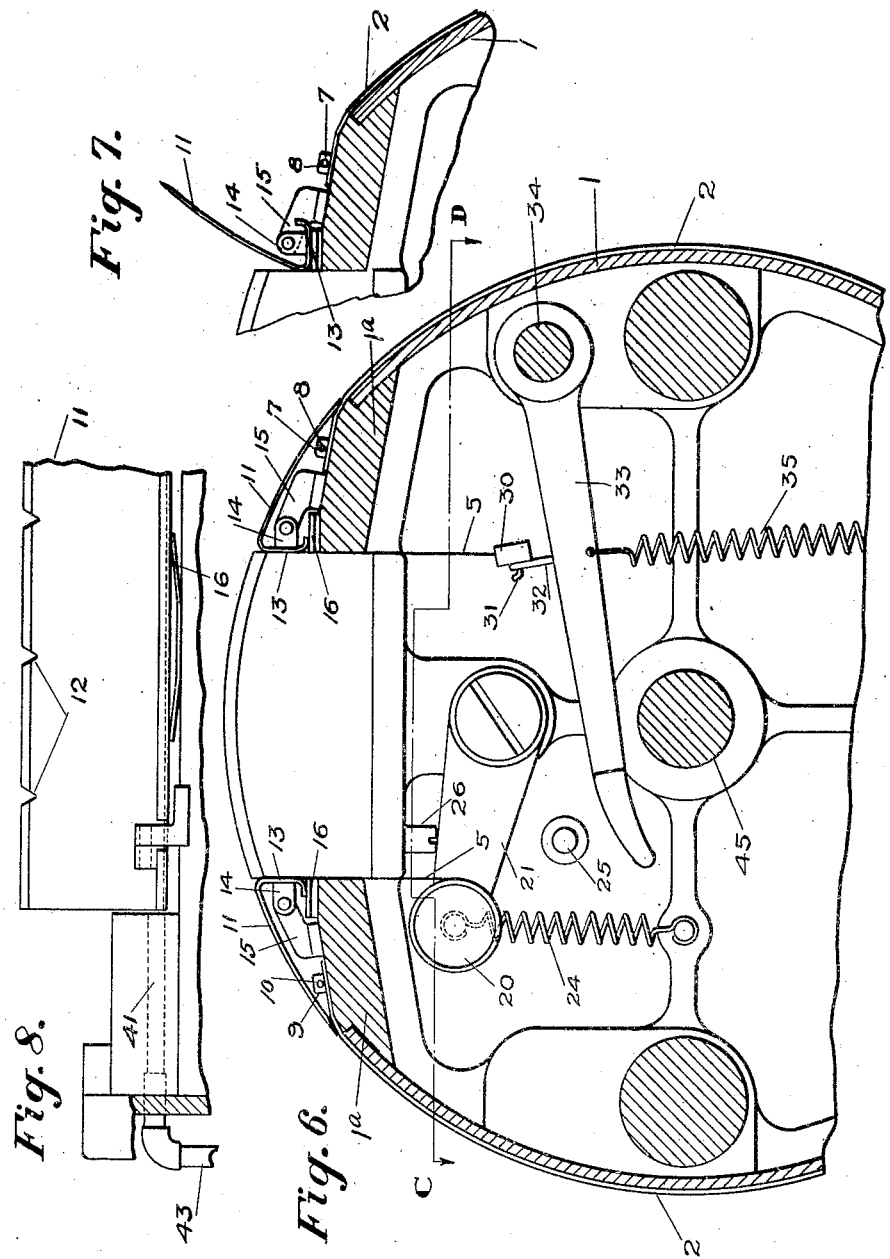

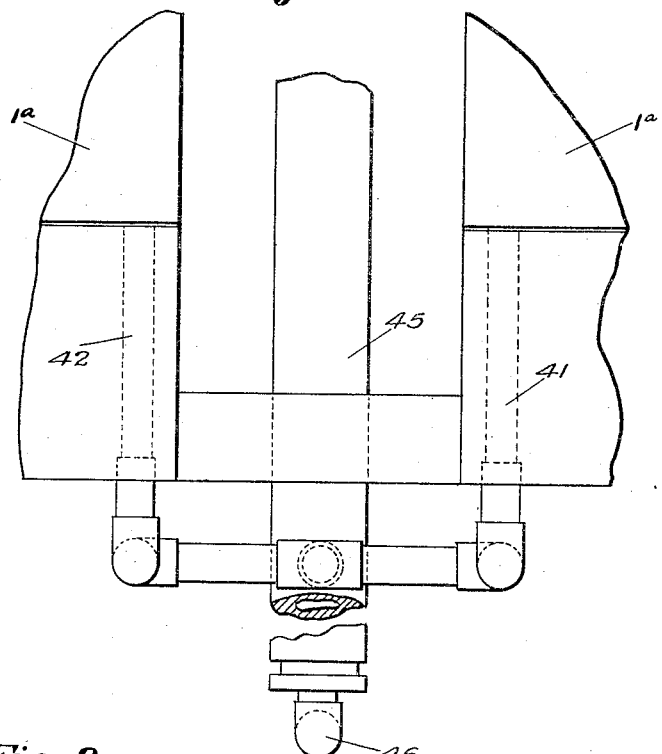
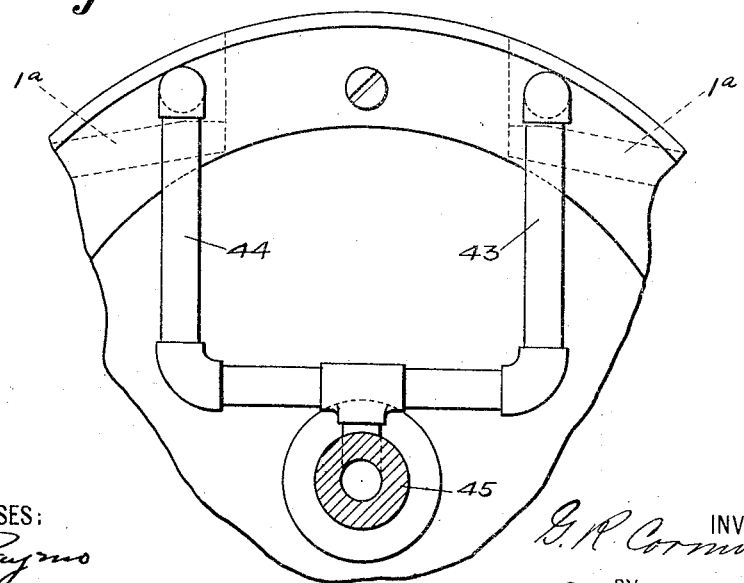

G. R. CORNWALL.
DEVICE FOR MAKING PRINTING PLATES.
APPLICATION FILED NOV. 30, 1914.
1,243,264.
Patented Oct. 16, 1917.
7 SHEETS—SHEET 7.
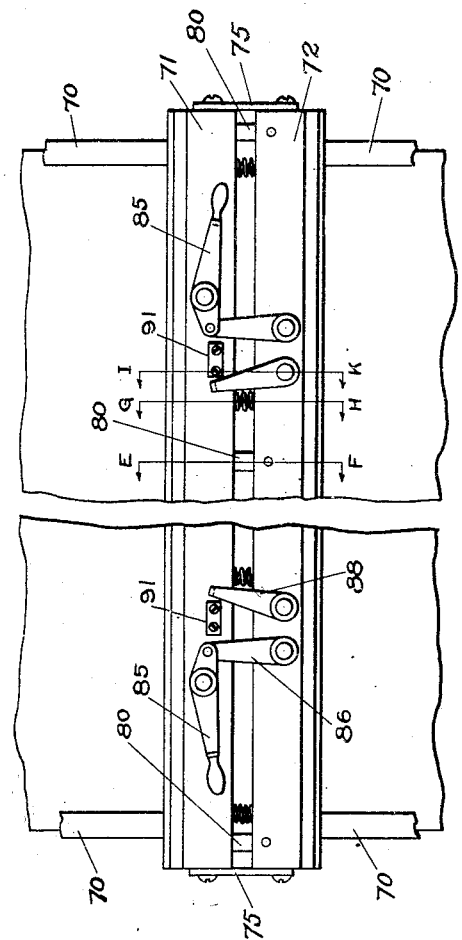
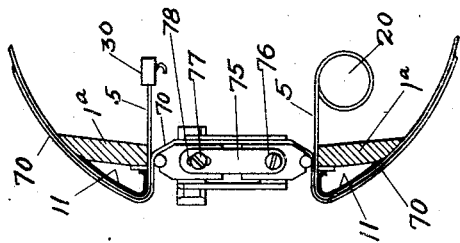
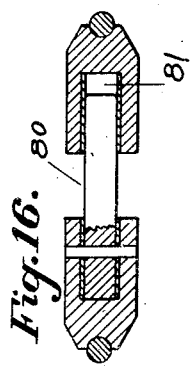
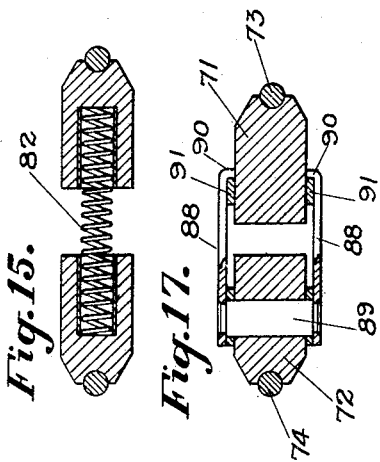

UNITED STATES PATENT OFFICE.

GEORGE R. CORNWALL, OF RYE, NEW YORK.

DEVICE FOR MAKING PRINTING-PLATES.

1,243,264.  Specification of Letters Patent.  Patented Oct. 16, 1917.

Application filed November 30, 1914.   Serial No. 874,926.

*To all whom it may concern:*

Be it known that I, GEORGE R. CORNWALL, a citizen of the United States, and a resident of Rye, in the county of Westchester and State of New York, have invented certain new and useful Improvements in Devices for Making Printing-Plates, of which the following is a specification.

The invention relates to apparatus for making printing plates and in many aspects thereof more especially to apparatus for making printing plates by the action of light upon the sensitized surface of the plate, and certain features of the invention relate to the utilization of aerial vacuum in holding the design or designs to the surface of the plate while exposed to the light.

The objects and advantages of the invention will be in part set forth hereinafter, and in part will be obvious herefrom; said objects and advantages being attained by the instrumentalities, combinations, and improvements pointed out in the accompanying claims.
The invention consists in the novel parts, arrangements, constructions, combinations and improvements herein shown and described.

The accompanying drawings herein referred to, and constituting a part hereof, illustrate one embodiment of the invention, and together with the description serve to explain the principles of the invention.

Of the drawings:
Figure 1 is an elevation of an apparatus embodying my invention, showing the rotating cylinder run out at one side of the light producing mechanism for accessibility in putting on and taking off the plates;
Fig. 2 is an end elevation, looking at Fig. 1 from the right, and showing the cylinder moved to the left into operative relation with the light producing means;

Fig. 4 is a central section, on an enlarged scale, on the line A—B of Fig. 1, looking toward the left;
Fig. 5 is a horizontal fragmentary section, on an enlarged scale, of the rotating plate carrying cylinder, on the line C—D of Fig. 6 looking downwardly;

Fig. 6 is a fragmentary sectional view, on an enlarged scale, of the upper portion of Fig. 4, but showing the parts in a different position;

Fig. 7 is a fragment corresponding to the upper right hand part of Fig. 6 but showing the plate clamp open;

Fig. 8 is a fragmentary view in elevation, looking at Fig. 7 from the right;

Fig. 9 is a fragmentary elevation, on an enlarged scale, of the end of the cylinder showing especially some of the air exhausting connections;

Fig. 10 is a fragmentary top plan corresponding generally to Fig. 9;

Fig. 12 is a view on a diminished scale, and with the thickness of the parts magnified, showing the elastic bands about the cylinder at the ends of the sealing sheet;

Fig. 13 is a fragmentary top plan of the sealing sheet clamp;

Fig. 14 is a fragmentary view looking at Fig. 13 from the end and showing the cylinder and plate in section;

Fig. 15 is a fragmentary section on line G—H of Fig. 13;

Fig. 16 is a fragmentary section on line E—F of Fig. 13; and

Fig. 17 is a fragmentary section on line I—K of Fig. 13.

Figure 3:
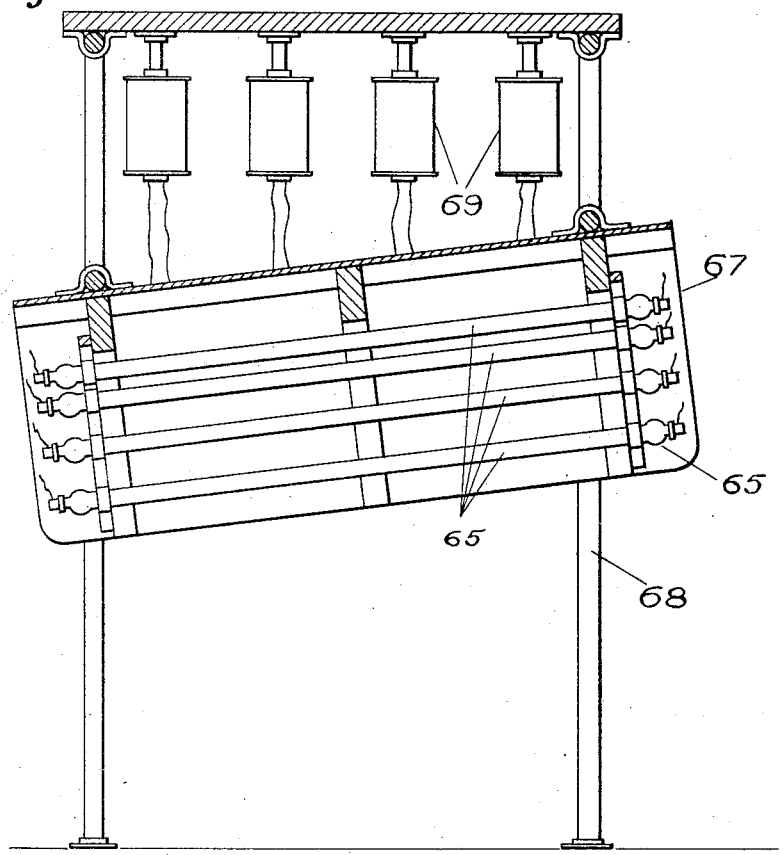
Fig. 3 is a central longitudinal section through the left hand half of Fig. 1 on a plane parallel of the paper.

The invention in certain of its aspects has especially in view insuring an absolutely uniform exposure or light action through the design or designs on to all parts of the sensitized plate, thereby producing a plate of relatively uniform printing efficiency throughout. In accordance with this feature of the invention, the sensitized plate with the positioned design or designs in contact therewith, preferably held on the sealing sheet, and the light are continuously traveled or moved relative to each other during the exposure of the plate beneath the design or copy, and preferably the plate is traveled or rotated relatively to stationary lights.

In the embodied form, the sensitized plate 2 is carried upon the surface of a rotatable cylinder 1, the plate 2 being held firmly and closely to the cylinder 1 by suitable means, and the copy or design bearing element or elements 3, from which the matter is to be printed or impressed upon the sensitized surface of the plate by the action of light, being positioned upon and closely pressed against the exterior sensitized surface of the plate 2 as it is carried upon the cylinder 1. As a matter of convenience, the design bearing element, or elements, may be first relatively positioned both with respect to each other and with respect to the printing plate in a suitable manner, as by being preliminarily positioned upon and attached to a light transmitting make-up sheet 4. The sheet 4 may be arranged closely about the plate 2 and serve to hold the design or copy bearing elements 3 closely and immovably to the sensitized surface of the plate 2 and in desired relative position thereon, so that when the printing plate is completed and placed on the press, the design whether letter press, illustrations, or other matter, will be printed in the proper and desired position upon each successive sheet of paper as it is fed through the press.

For the purpose of procuring close and immovable contact between the design elements and the sensitized surface of the plate, vacuum or air pressure is exerted against the surface of the plate and upon the design bearing elements and upon the make up sheets, when used, as these are arranged about the cylinder 1 by suitable means. As embodied, such means include a light transmitting air tight or air sealing sheet 5, arranged around the cylinder 1 exteriorly to the plate, the design and the make-up sheet, already mentioned.

Referring in more detail to the embodied mechanism for holding the plate 2, and the copy or design bearing elements 3 and the coöperating parts to the cylinder, the sensitized plate (which may be, by way of illustration, a zinc or aluminum plate for planographic printing, and having its surface sensitized by a suitable agent, such as a chromated albumen or colloid) is fixed to and held upon the cylinder by suitable devices, which include a series of posts 7, arranged longitudinally at suitable intervals along flatted portions 1ª of cylinder 1, extending longitudinally of the cylinder at either side of an opening into the cylinder (see Figs. 4, 6, 7, 9, 10 and 14). Apertures are provided in the plate 2, close to its edges, to fit over the posts 7, and after the plate is positioned with the posts through the openings in one edge of the plate, pins 8 may be slipped through holes in the posts 7 to keep the plate in position. The plate 2 is then bent smoothly about the cylinder 1, and the apertures in the opposite side edge of the plate fit over posts 9, similar to the posts 7, and having retaining pins 10.

Figure 11:
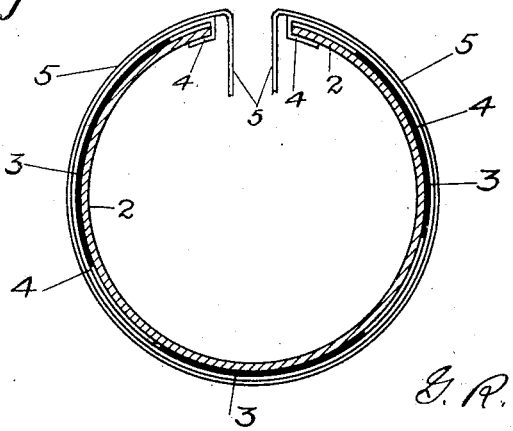
Fig. 11 is a vertical section through the cylinder diagrammatic in character, and showing the relation of the plate, the copy, the retaining means, and the vacuum creating or air sealing layer, the cylinder itself being omitted for clearness.

When a plurality of designs are preliminarily spaced with reference to each other, upon a make-up sheet, such for instance as is shown in my application Ser. No. 874,928, filed November 30, 1914, co-pending herewith, the make-up sheet 4 will be positioned with respect to the plate 2 by suitable marks or otherwise, and preferably will have its edges folded about and attached to the side edges of the plate (as shown best in Fig. 11), before the plate 2 is placed upon the cylinder 1 and over the posts 7. This brings and maintains the design or copy bearing elements in contact with the sensitized surface of the plate and in proper relative position upon the plate, and also in proper position in relation the the paper gripper margin on the impression cylinder of the printing press when the plate is ultimately used to print from.

Means are provided which assist in holding the plate and make-up sheet upon the cylinder and also form air conducting passages or chambers along the cylinder to assist in properly and easily conducting out the air from about the cylinder and underneath the sealing sheet, to rapidly and effectively produce and maintain a high degree of vacuum. The embodied form of such means comprises clamping members 11, which extend along the flat portions 1ª of cylinder 1, at either side of the longitudinally extending opening thereinto, previously described, (see Figs. 4, 6, 7, 8, and 14). These clamping members comprise angularly bent, pivotally mounted, plates of metal adapted to close down upon the plate and make up sheet, and to swing upwardly therefrom (see Figs. 4, 6, 7 and 8). The clamping part of the member 11, that is the flat blade which presses against the exterior of the make-up sheet, is preferably provided with a series of apertures or notches 12 therethrough, which serve as air conduits for drawing out the air from between the plate or make-up sheet and the exterior translucent sealing sheet 5, which latter in the embodied form passes over the clamps 11. The back or inner portion of each clamp 11 is angled or bent over, as shown at 13, with lugs 14 extending therefrom, said lugs being pivotally supported upon brackets 15, mounted on the flatted parts of cylinder 1, previously described. Similar clamping means are provided at the opposite edge of the printing plate and are indicated by the same reference numerals. Flat springs 16 are placed beneath the inner end of the clamps 11 to hold them in the open or closed position and to exert a clamping pressure when in the closed position.

The light transmitting sealing sheet 5 is then drawn about the make-up sheet 4 so that a vacuum may be created therewithin to utilize the external air pressure in giving the requisite close contact between all parts of the design and the sensitized surface of the plate 2.

The light transmitting sealing sheet 5 should preferably extend beyond the plate 2 at both ends of the cylinder, far enough to enable it to be held in perfect contact with the cylinder to make an air tight joint. As embodied, elastic bands 70 are slipped over the ends of the sealing sheet holding it firmly to the cylinder 1 (see Figs. 12 and 14).

In the embodied form, the sealing sheet 5 is carried by and within the cylinder 1. It is rolled about a spring roller 20, which spring roller is journaled in swinging arms 21, said arms being pivotally mounted at 22 upon the inner side of the heads 23 of the cylinder 1. The arms 21 are acted upon by springs 24, respectively, and stops 25 on the cylinder heads serve to limit the movement of the arms downwardly in response to the pull of the springs. Adjustable stops 26 serve to limit the upward movement of the arms 21. After the plate 2, the designs 3, and the make-up sheet 4, are placed about cylinder 1, the sealing sheet 5 is drawn off from the spring roller 20 over the clamp 11 at the left hand side of Fig. 6, and it is passed about the cylinder 1 and thus around the make-up sheet 4, and over the other clamping devices 11 at the right hand side of Fig. 6, and within the cylinder 1, and there it is attached to stretching and tension-maintaining means within the cylinder 1.

The embodied form of such means comprises a rod or strip 30 extending along and attached to the end of the sheet 5 and having attached thereto hooks 31, which hooks engage into loops 32 fixed, respectively, upon a series of lever arms 33. Lever arms 33 are loosely pivoted upon a supporting shaft or rod 34, which rod is mounted upon the heads 23 of the cylinder 1. Each of the arms 33 is acted on by a spring 35, each spring tending to draw its arm downwardly (in Figs. 4 and 6) and thus keep the sealing sheet taut or stretched smoothly about the cylinder 1. The levers 33 are lifted against their springs 35 to pass the hooks 31 through the loops 32, and when the levers 33 are released the springs 24 and 35 serve to draw the sealing sheet 5 tautly about the make-up sheet. The springs 24 and 35 also guard against any slight difference in length of sealing sheet 5, as the various parts along the sheet are each stretched fully and tightly by the independent action of the respective springs.

A slotted support 36 within cylinder 1 (see top of Fig. 4) holds rod or strip 30 and thus prevents the sheet 5 being drawn farther by spring roller 20.

Suction or vacuum producing means are provided whereby the design or designs, are held absolutely in close contact with the sensitized surface of the plate despite any inequalities therein, and thereby securing a clear impression, by the light, of the design upon the plate. The embodied form of such means is designed to operate continuously while the cylinder 1 is being revolved during the exposure of the plate beneath the designs to the lights. As embodied, channels 41 and 42 (Figs. 8, 9 and 10) communicate with the passage ways or chambers formed beneath the clamps 11 and above the flat extensions 1ª of the cylinder 1. Said passage ways connect to pipes 43 and 44, respectively, which pipes in turn connect to the axis or shaft 45 of the cylinder 1. The rarefaction and substantial exhaustion of the air through the passageways draws in the air through the openings 12 directly or in a straight or direct line from between the sealing sheet and the plate and make-up sheet, as contrasted with the circuitous or doubled back path of vacuum tables wherein the plate is flat and the air sucked out through a passage perpendicular to the plate and against the back of the plate. In my invention the passage way along the edge of the plate furnishes a much more efficient and direct acting suction means. Pressure upon the sealing sheet by hand or otherwise may be used to work out the air. The axis 45 is hollow and at one end it is connected to a pipe 46, which pipe communicates with an air pump 47. Pump 47 is driven by motor 48, which motor is mounted upon the supporting frame for the cylinder 1. The shaft 45 rotates with cylinder 1, said shaft being journaled at its ends in bearings 50 and 51, carried upon uprights 52 and 53 of the support 54. Means are provided for rotating the cylinder 1, and as embodied such means include a belt pulley 57 fixed to the shaft 45, with a belt 58 running thereover and over driving pulley 59 of a motor 60 mounted on the support 54. Thus the rotating means and the suction means will be operated together during the exposure of the plate. A hand wheel 61 is provided to rotate the cylinder 1 to facilitate putting on and taking off the plate.

For the purpose of permitting the cylinder to be run readily to and from beneath the lights, the support 54 is mounted upon wheels 55 running upon a track 56, which track extends beneath the light producing mechanism and out to one side thereof.

In accordance with one feature of my invention, the plate cylinder is exposed to a battery of stationary mercury vapor lights, and in the embodied form the cylinder 1 has its axis angularly inclined, as shown in Fig. 1 (but omitted from Fig. 2 for the sake of clearness in showing other parts). Thus the mercury vapor lights will make their circuit and light up by merely throwing on the current and without the necessity of tipping the lights in order to start them.

In the embodied form of light producing means, a battery of mercury vapor tubes 65 are arranged alongside each other, and in substantially hemi-cylindrical position, about, and spaced slightly away from cylinder 1, when the carriage 54 and the cylinder are run in beneath the lights, or toward the left in Fig. 1. The tubes 65 are inclined sufficiently to take their circuit and to become luminous by merely turning on the current. The inclination of cylinder 1 corresponding to that of the tubes 65 gives uniform light effect all along the sensitized plate 2 upon the cylinder. Back of the tubes 65 is arranged a series of reflectors 66 supported in a support 67. The support 67 is carried by a frame 68, the condensers 69 for the lamps being conveniently supported from the upper part of the frame.

Means may be provided for closing or clamping the sealing sheet where it passes within the cylinder. The embodied form of such means comprises two side-by-side bars 71 and 72, mounted to be movable toward and from each other, and adapted to be placed in the longitudinal opening in the cylinder 1 (Figs. 13 and 14) and to press the sealing sheet 5 against the inner faces of projections 1ª. The bars 71 and 72 are forced apart from each other in alinement with the parts 1ª of the cylinder (Fig. 14) thus forming an air tight joint. The bars 71 and 72 may have strips 73 and 74, of resilient material, such as rubber, on their bearing faces, to make a closer fit. The bars 71 and 72 are held together and in alinement by suitable means, such as links 75 at the ends thereof. The links 75 are held to one of the bars by screws 76, and are connected to the other bar by a screw 77 passing through a slot 78, thus permitting the approach and separation of the bars. Intermediately their ends are fixed to one of the bars rectangular guiding fingers 80, which extend, respectively, into corresponding recesses 81 in the other bar.

Resilient means operating to press the bars apart are also provided, and as embodied comprise spiral springs 82 nested in corresponding apertures in both the bars and in compression therebetween. Thus the bars are kept in alinement in every direction by the links and fingers, which also serve as limiting stops to the resilient separating action or movement of the springs.

Means are provided for drawing together the bars 71 and 72 and holding them against the action of the springs. The embodied form of such means comprises two pivoted hand levers 85, each pivotally mounted at or near one of the ends of bar 71. Pivotally connected to each lever 85 is a pivoted link 86, which link is pivotally connected to bar 72. By moving levers 85 the bars 71 and 72 may be drawn together against their springs. When so drawn together, the bars may be latched, the embodied form of latching means comprising latch arms 88 on either side of the bar 72 each fixed to a shaft 89 to move together. The latch arms 88 have inwardly bent ends 90 which may be swung over detents 91 on the bar 71, which will hold the bars 71 and 72 retracted toward each other until released. When so retracted, the device may be placed in position as shown in Fig. 17. After the device is so in position, the latches are released, and the springs cause the bars 71 and 72 to press outwardly against the projections 1ª with the sealing sheet 5 therebetween, as shown in Fig. 14. When the device is to be removed, the levers 85 are operated to draw the bars together, and the latches 88 are passed over their detents 91. The elastic sealing bands 70 may be drawn tighter by being pressed inwardly beneath the bars 71 and 72.

The manner of operation of the device will be understood from the foregoing both as to its general features and as to details. It may be stated in addition that after the plate, and the design and make-up sheet and the sealing sheet are placed about the cylinder 1, this being done while the carriage 54 is at the right in Fig. 1 and with the space clear above and around the cylinder, this providing free access for manipulation of the device, the air pump is started, and the suction utilized to exhaust all the air and to insure the designs being firmly in contact with the plate, and with free space for inspection to determine when complete and satisfactory establishment of the vacuum is accomplished. Thereafter the carriage 54 is run beneath the lights and the motor 60 started to rotate the cylinder 1. The lights are then thrown on for the requisite time of exposure.

It will thus be seen that the device occupies relatively little floor space, and that full access is afforded during the putting on and taking off of the plate and for inspection and manipulation during the establishment of the vacuum. The inclination of the axis permits the use of the vapor lights without it being necessary to tip or rock the lights and doing away with any such mechanism. The rotation of the plate provides absolutely uniform light action on all parts of the plate, and completely prevents streaking or variations of exposure in case of variation in the actinic power or action of the various lights, and in the case of one or more of the lights going dead. The suction action is also very direct and efficient and the plate has a smooth firm support or backing throughout. The work is also always accessible and in view when the device is being loaded or prepared for exposing the plate.

These and other objects and advantages of the invention will be further obvious to those skilled in the art. It will be further understood that changes may be made from the particular mechanism shown and described without departing from the principles of the invention and without sacrificing its chief advantages.

What I claim as my invention, and desire to secure by Letters Patent, is:—

1. A machine for making printing plates including in combination a plate support for a sensitized plate, means carried by said support for fastening a sensitive plate thereto, means for holding a design upon the sensitized surface of the plate, a light, and means for moving said support with the plate and its design held thereon, and the light relatively to each other during the exposure.

2. A machine for making printing plates including in combination a plate support for a sensitized plate, means carried by said support for fastening a sensitive plate thereto, means for holding a design upon the sensitized surface of the plate, a fixed light, and means for moving said support with the plate and its design held thereon while exposed to the light.

3. A machine for making printing plates including in combination a plate support for a sensitized plate, means carried by said support for fastening a sensitive plate thereto, means for holding a design upon the sensitized surface of the plate, a light, and means for effecting rotational relative movement between the plate support and the light during the exposure.

4. A machine for making printing plates including in combination a plate support for a sensitized plate, means for holding a design upon the sensitized surface of the plate, a fixed light, and means for rotating the support with the plate and its design held thereon while exposed to the light.

5. A machine for making printing plates including in combination a cylinder for supporting a sensitized plate, means carried by said support for fastening a sensitive plate thereto, means for holding a design upon the sensitized surface of the plate, a light, and means for rotating the support with the plate and its design held thereon, and the light relatively to each other.

6. A machine for making printing plates including in combination a cylinder for supporting a sensitized plate, means carried by said support for fastening a sensitive plate thereto, means carried by the plate for holding a design upon the sensitized surface of the plate, a light extending lengthwise of said cylinder and means for rotating the cylinder with the plate and its design held thereon, and the light relatively to each other.

7. A machine for making printing plates including in combination a cylinder for supporting a sensitized plate, means carried by the plate for holding a design upon the sensitized surface of the plate, a stationary light, and means for rotating the cylinder and its plate relatively to the light.

8. A machine for making printing plates including in combination a cylinder supporting a sensitized plate, means carried by said support for fastening a sensitive plate thereto, a flexible translucent sheet for holding a design upon the sensitized surface of the plate, a plurality of lights, and means for rotating the plate and its design held thereon, and the lights relatively to each other.

9. A machine for making printing plates including in combination a plate support for a sensitized plate inclined from the horizontal, means upon the support for fastening a sensitized plate thereon, an incandescent vapor lamp inclined from the horizontal, and means for effecting rotational relative movement between the plate support and the light during the exposure.

10. A machine for making printing plates including in combination a rotatable plate supporting cylinder having means for supporting a sensitized plate with its axis slightly inclined to the horizontal, a plurality of correspondingly inclined lights extending along the cylinder and in circular arrangement thereabout, and means for rotating the cylinder with its plate.

11. A machine for making printing plates including in combination a plate support for a sensitized plate, means carried by said support for fastening a sensitized plate thereon, a light, means for moving the plate support and the light relatively to each other during the exposure, a carriage for moving the plate support and light apart to permit free access to put on and take off the plate, the plate support and the means for moving it being mounted upon said carriage.

12. A machine for making printing plates including in combination a rotatable plate support for a sensitized plate, means carried by said support for fastening a sensitized plate thereon, a light, means for effecting rotational relative movement between the plate support and the light during the exposure, a carriage upon which the plate support is mounted for moving the plate support and light apart to permit free access to put on and take off the plate, said rotation effecting means being mounted upon said carriage.

13. A machine for making printing plates including in combination a rotatable plate support for a sensitized plate, means carried by said support for fastening a sensitized plate thereon, a fixed light, means for rotating the plate support and its design held thereon while exposed to the light and means carrying said plate support for moving the plate support and light apart to permit free access to put on and take off the plate.

14. A machine for making printing plates including in combination a rotatable plate supporting cylinder having means for supporting a sensitized plate, with its axis angularly inclined from the horizontal, a plurality of lights inclined from the horizontal and extending along the cylinder and in circular arrangement thereabout, means for rotating the cylinder with its plate support and means for moving the cylinder with its plate support and light apart to permit free access to put on and take off the plate.

15. A machine for making printing plates including in combination a rotatable plate support for a sensitized plate rotatably mounted upon a carriage with its axis slightly inclined from the horizontal, means carried by said support for fastening a plate thereon, a light, means for effecting rotational relative movement between the plate and the light during the exposure, and means for moving the carriage with its plate support and light apart to permit free access to put on and take off the plate.

16. A machine for making printing plates including in combination a rotatable plate supporting cylinder having means for supporting a sensitized plate with its axis slightly inclined from the horizontal, a plurality of correspondingly inclined lights extending along the cyinder and in circular arrangement thereabout, means for rotating the cylinder with its plate and means for moving the plate support and light apart to permit free access to put on and take off the plate.

17. A machine for making printing plates including in combination a rotatable plate supporting cylinder, having means thereon for fastening a sensitized plate thereto, lighting means, means for rotating the cylinder with its plate, a stationary support for the lights, and a movable carriage for the cylinder whereby it may be run to one side of the lights to put on and take off the plate, said rotating means being carried by said carriage.

18. A machine for making printing plates including in combination a plate support for a sensitized plate, mechanical means carried by said support for fastening the plate upon said support, a light, means for moving the plate and its design held thereon, and the light relatively to each other during the exposure, and means for holding the design to the plate by air pressure.

19. A machine for making printing plates including in combination a rotatory plate support for a sensitized plate, mechanical means carried by said support for fastening a sensitive plate thereto, a light, means for effecting rotational relative movement between the plate and the light during the exposure, and means for holding the design to the plate by air pressure.

20. A machine for making printing plates including in combination a rotatable plate supporting cylinder having means for supporting a sensitized plate with its axis slightly inclined to the horizontal, a plurality of correspondingly inclined lights extending along the cylinder and in circular arrangement thereabout, means for rotating the cylinder with its plate and means for holding the design to the plate by air pressure.

21. A machine for making printing plates including in combination a rotatable plate supporting cylinder having means thereon for fastening a sensitized plate, a plurality of lights extending along the cylinder and in circular arrangement thereabout, means for rotating the cylinder with its plate, a stationary support for the lights, and a movable carriage for the cylinder whereby it may be run to one side of the lights to put on and take off the plates and means mounted on said carriage for producing air pressure to hold the design to the plate.

22. A machine for making printing plates including in combination a rotatable plate supporting cylinder having means thereon for fastening a sensitized plate, a plurality of lights extending along the cylinder and in circular arrangement thereabout, means for rotating the cylinder with its plate, a stationary support for the lights, a track beneath the lights and extending to one side therefrom, and a carriage for the cylinder running upon said track and means mounted on said carriage for producing air pressure to hold the design to the plate.

23. A machine for making printing plates including in combination a rotatable plate supporting cylinder having means for supporting a sensitized plate, a plurality of lights extending along the cylinder and in circular arrangement thereabout, means for rotating the cylinder with its plate, a stationary support for the lights, and a movable carriage for the cylinder whereby it may be run to one side of the lights to put on and take off the plates, means mounted upon said carriage for rotating said cylinder and means mounted on said carriage for producing air pressure to hold the design to the plate.

24. A machine for making printing plates including in combination a rotatable plate supporting cylinder having means for supporting a sensitized plate, a plurality of lights extending along the cylinder and in circular arrangement thereabout, means for rotating the cylinder with its plates, a stationary support for the lights, a track beneath the lights and extending to one side therefrom, a carriage for the cylinder running upon said track, means mounted upon said carriage for rotating said cylinder, and means mounted on said carriage for producing air pressure to hold the design to the plate.

25. A machine for making printing plates including in combination a rotatable plate carrier, means carried thereby for fastening a plate thereto, pneumatic means for holding a design thereon, said means comprising a translucent sheet attached to said plate carrier.

26. A machine for making printing plates including in combination a rotatable plate carrier, means carried thereby for fastening a plate thereto, means for holding a design thereon, said means comprising a translucent sheet attached to said plate carrier.

27. A machine for making printing plates including in combination a rotatable plate carrier, means carried thereby for fastening a plate thereto, pneumatic means for holding a design thereon, said means comprising a translucent sheet attached to said plate carrier and means for creating suction within said sheet.

In testimony whereof, I have signed my name to this specification, in the presence of two subscribing witnesses.

GEORGE R. CORNWALL.

Witnesses:
JOHN D. MORGAN,
LOUISA LOEHR.

Copies of this patent may be obtained for five cents each, by addressing the "Commissioner of Patents, Washington, D. C."